June 23, 1942.   A. MUELLER   2,287,192
THREADING HEAD FOR A MACHINE TOOL
Filed March 27, 1940   3 Sheets-Sheet 1

Inventor:
Alfred Mueller
By: Joseph O. Lange, Atty.

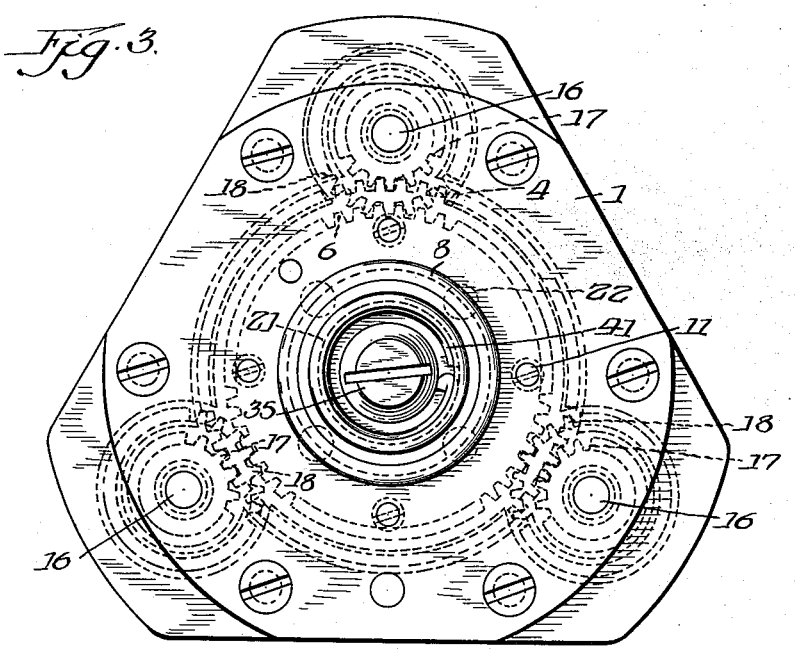
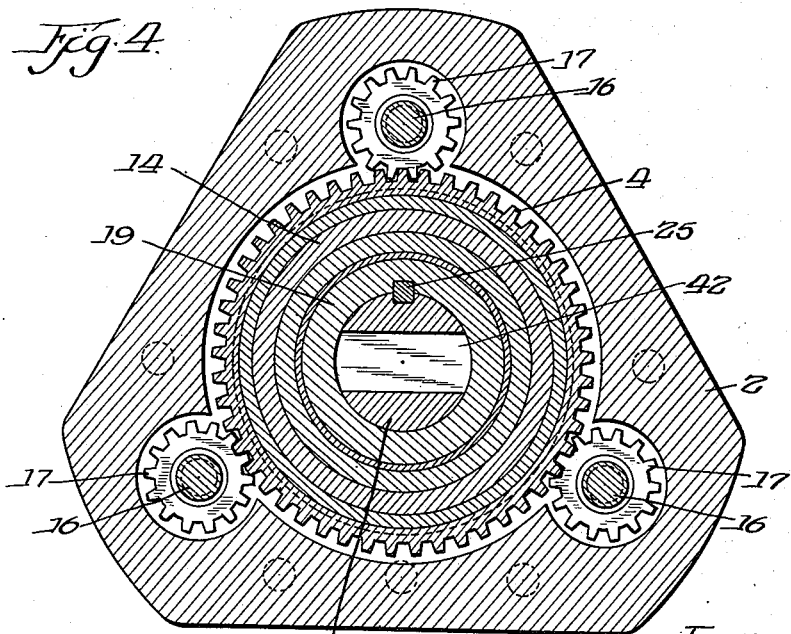

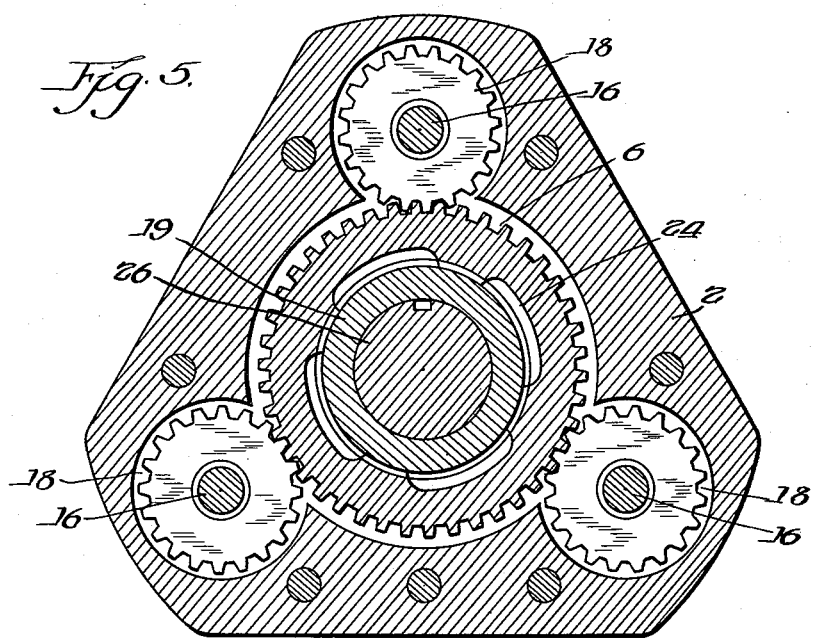
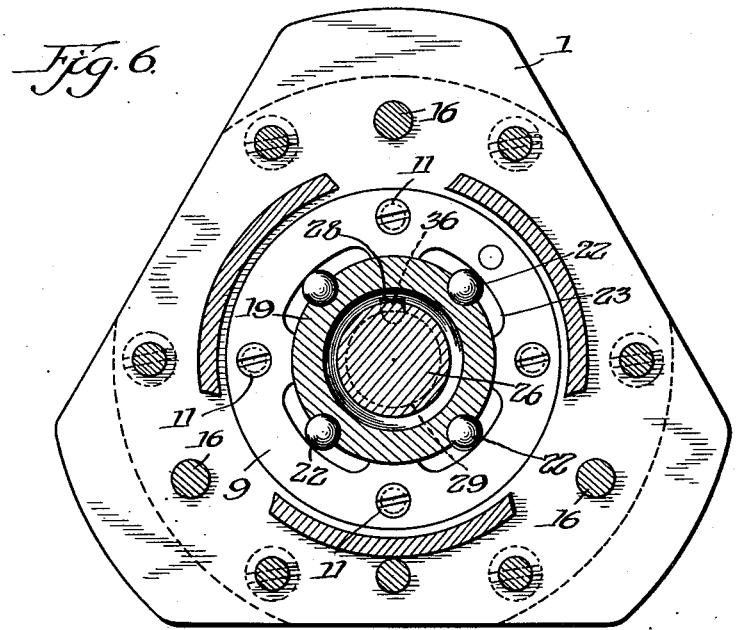

Patented June 23, 1942

2,287,192

UNITED STATES PATENT OFFICE 2,287,192

THREADING HEAD FOR MACHINE TOOLS

Alfred Mueller, Berwyn, Ill., assignor to Crane Co., Chicago, Ill., a corporation of Illinois Application March 27, 1940, Serial No. 326,152

9 Claims. (Cl. 10—138)

My invention appertains to a threading head and in a more particular sense it relates to a device for holding a cutter, such as, for example, a non-collapsible type tap, die or the like threadcutting tool, in cooperation with a work spindle whereby during the threading operation the said cutter is held non-rotatable with respect to the holding device but upon completion of the cutting operation, and for the purpose of extracting or withdrawing the cutter from the article upon which work has been performed, the said cutter is caused to rotate in such a manner as is necessary to withdraw and unscrew it from the article.

Heretofore, in the art of screw-thread cutting in connection with non-collapsible type taps and dies mounted upon the turrets or tailstocks of lathes, or the work spindles of other machines, wherein an article upon which it is desired to cut screw-threads is secured in a rotatable chuck mounted upon a work spindle, upon completion of the cutting operation and for the purpose of removing the tap or the cutting tool from the article it has previously been necessary to reverse the direction of rotation of the chuck. My invention makes possible the removal of the cutting tool from the article in a simple and convenient manner without resorting to any change whatsoever in the rotation of the work spindle.

Accordingly, one of the primary objects of my invention lies in the provision of a threading head adapted for mounting upon a holding device of a lathe or similar machine tool and capable of non-rotatably holding a tool during the threading operation, wherein the holding device serves to feed the cutter into the article, but upon completion thereof, by means cooperating with the chuck of the work spindle, the said threading head makes possible the removal of the tool from the article by the relatively simple procedure of withdrawing the head from the work spindle.

Another object of my invention is to provide a simple and inexpensive thread-cutter head comprising a self-contained driving unit engageable upon withdrawal of the holding device from the work spindle at the completion of the threading operation and adapted thereupon to rotate the cutting tool in the direction of rotation of the work spindle but at a sufficiently higher velocity than the rotation of the work spindle in order to effect the removal by unscrewing of the tool from the work article.

A still further object lies in the provision of a novel driving unit for a thread cutter wherein the driving power is derived from the work chuck and wherein the driving unit is automatically disengaged during the tool feeding operation and is automatically engaged during the tool withdrawing operation.

These and other objects and advantages of my present invention will become more readily apparent upon proceeding with the following detailed description of a preferred construction of a threading head which is to be construed in connection with the accompanying drawings in which:

Fig. 3 is an exterior end elevation thereof looking toward the mounting post.

Fig. 4 is a sectional view taken on the line 4—4 of Fig. 1.

Fig. 5 is a sectional view taken on the line 5—5 of Fig. 1.

Fig. 6 is a sectional view taken on the line 6—6 of Fig. 1.

Like reference numerals refer to like parts throughout the various views of the drawings.

Figure 1:
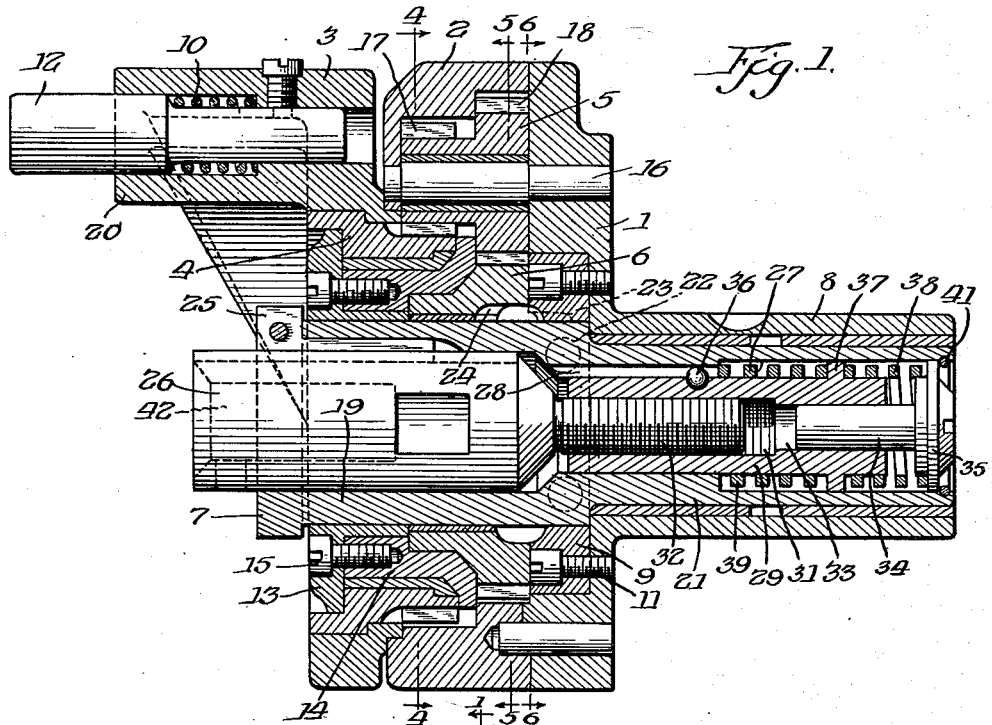
Fig. 1 is a vertical sectional view of a threading head embodying my invention.
Figure 2:
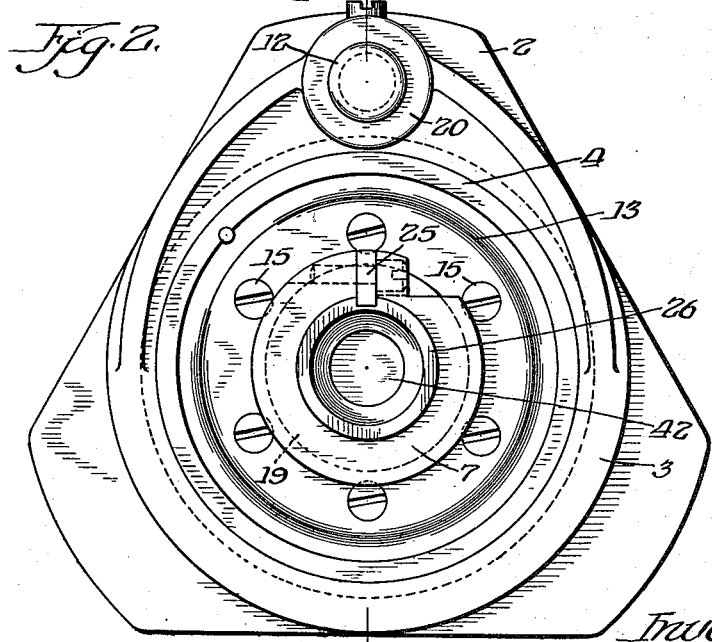
Fig. 2 is an exterior end elevation thereof looking toward the tool socket.

Referring to Fig. 1, the threading head comprises essentially a holder 1, a casing or body 2, a drive ring 3, a drive gear 4, a plurality of idler gears 5, a driven gear 6 and a spindle 7. The holder 1 is preferably made substantially triangular as is more clearly shown in Figs. 2 and 3 and is provided with a concentric hollow cylindrical post 8, the latter being suitably adapted for secure mounting upon a turret or tailstock of a lathe, or other machine tool holding device, (not shown). The face of the holder 1 is preferably provided with a recess wherein the renewable clutch ring 9 is detachably secured by means of the cap screws 11. However, if desired, the clutch ring may be formed integral with the holder.

The body or casing 2 comprises a triangularly shaped shell adapted to be secured to the face of the holder 1 and substantially enclose the gear mechanism of the head. The drive ring 3 has an eccentric axially projecting boss 20 within which a drive bar 12 is mounted for limited resilient axial movement, the resilience being provided by the spring 10 and serving to prevent jamming of the drive bar against the chuck face or jaw as the head is moved forward. The assembly provided with the drive ring 3 includes the front bearing 13, the drive gear 4 and the drive gear bearing 14 all of which are maintained in assembled relation by the cap screws 15.

The idler gears 5 are rotatably mounted upon the shafts 16, with the small gear portions 17 in meshing engagement with the drive gear 4 (see Fig. 4) and the large gear portions 18 in meshing engagement with the driven gear 6 (see Fig. 5). Thus the driven gear 6 upon rotational movement of the drive ring 3 is caused to rotate in the direction of rotation of the drive ring but at an increased velocity which corresponds to the ratio of the gearing through the train of gears from the drive gear 4 through the idler gear 5 to the driven gear 6. I have found that a gear ratio of about 2 to 1 is satisfactory, although, of course, this ratio may vary depending upon the purpose intended or the function to be performed.

The spindle 7 comprises a hollow cylinder having an enlarged portion 19 journaled within the threading head and a reduced portion 21 journaled within the post 8. As more clearly shown in Fig. 6, the periphery of the enlarged portion 19 is provided with a plurality of hemispherical recesses for the reception and retention of the balls 22. Also, referring to Figs. 1, 5 and 6, the clutch ring 9 and the driven gear 6 are provided with suitable recesses 23 and 24 respectively for the reception of the outward, or exposed, portion of the balls 22 whereby the spindle is permitted limited reciprocal movement between engagement of the balls within the recesses 23 (as shown) and within the recesses 24 of the driven gear 6. Thus it can readily be understood that with the spindle in the position shown rotational movement thereof is restricted to the extent of the recesses 23 and, similarly, with the spindle in the forward position wherein the balls 22 are in engagement with the recesses 24 of the driven gear 6, independent rotational movement is restricted to the extent of the recesses 24 and further, any rotational movement imparted to the driven gear will in turn be transmitted to the spindle 7. As more clearly shown in Figs. 1 and 2, a slip key 25 is provided in the forward or enlarged portion 19 of the spindle for the purpose of securing a suitable tool socket 26 therewithin against independent rotational movement. The hollow reduced portion 21 of the spindle is provided with a counterbore 27 and an axial groove 28 for purposes to be hereinafter described in greater detail.

Positioned within the reduced portion 21 of the spindle, I prefer to provide an adjusting bar 29 having the forward end internally screwthreaded as at 31 to receive the externally threaded shank 32 of the tool socket thereby making possible a desired axial positioning of the tool with respect to the drive bar 12. The opposite end of the bar 29 is bored as at 33 to receive the guide post 34 of the spring retainer 35. The external surface of the adjusting bar 29 is provided with a hemispherical recess for the reception and retention of the ball 36, the outer portion of the latter extending into the groove 28 of the spindle (see Fig. 6). An annular laterally projecting rib 37 is provided on the bar 29 which extends to the wall of the counterbored portion 27 and thereby supplies suitable shoulders for the coiled springs 38 and 39 to act upon and maintain the assembled adjusting bar 29 and the tool socket 26 in a restrained axially reciprocable relationship with respect to the spindle. The spring retainer 35 may be retained within the counterbored portion 27 of the spindle in any suitable manner. However, I prefer to utilize for that purpose a coil of spring wire 41 set into a shallow annular groove adjacent the end of the spindle.

The manner in which it is contemplated that the hereinabove described embodiment of my invention will be operated comprises securing the mounting post 8 within a tailstock, turret or other holding device of a lathe or machine tool and inserting the shank of a suitable tool, such as a tap or a die, in the recess 42 provided in the socket 26. According to the usual procedure, an article upon which it is desired to perform machining operations is gripped between the jaws of a rotatable chuck mounted upon a work spindle. While the chuck and work article are rotating at a desired speed, the threading head and tool are advanced toward the work article and the tool is fed into the work article to perform the desired machining. At a predetermined position, preferably simultaneously with the start of the threading, the drive bar 12 will come in contact with the side of one of the chuck jaws or other projection on the face of the work spindle and thereupon cause the drive ring 3 and assembled parts to rotate therewith. However, during the tool feeding operation the spindle 7 is maintained in the position shown wherein the balls 22, by reason of their engagement with the recesses 23, prevent both rotational and further backward movement of the spindle. Thus the tool is held non-rotatable with respect to the holding device during the threading operation but is permitted limited axial movement by reason of the springs 38 and 39. Upon completion of the threading operation the holding device is withdrawn or moved away from the work spindle thereby causing the spindle 7 to move forward with respect to the head and carry the balls 22 into the recesses 24 in the driven gear 6 whereupon the spindle 7 and tool are rotated in conjunction with the geared driving mechanism contained in the head. As previously stated, the gear ratio in the head is such that the spindle 7 and tool are rotated at a suitably higher speed than the speed of the work spindle and thereby accomplishes unscrewing or extraction of the tool from the work article.

While I have shown and described herein a certain specific structure embodying my invention, it will be manifest to those skilled in the art that various modifications and rearrangements of the parts may be made without departing from the spirit and scope of the invention, and that the same is not limited to the particular form herein shown and described, except insofar as specified in the appended claims.

I claim:

1. A threading head of the type described, the said head comprising a combined threading holder and spindle, a driving member, a driven member, the said driving member being engageable with the said driven member to drive the said driven member at a rotational velocity in excess of the rotational velocity of the said driving member, the said driving member including a drive ring and idler gears whereby upon rotational movement of the drive ring the driven member is caused to rotate in the direction of rotation of the drive ring but at an increased velocity, the said spindle being normally non-rotatable but upon predetermined axial positioning thereof being engageable with the said driven member for rotational movement therewith, a clutch ring cooperating with the said spindle, the said driven member having an annular recess providing for engagement by movable means positioned upon the spindle, the said movable means being positioned within the annular recess of the driven member, the said latter movable means comprising balls in the outer periphery of the said spindle selectively engageable respectively with grooves in the said driven member or with grooves in the said clutch ring for rotating the spindle after threading is done or locking the spindle against rotation during the threading operation.

2. A threading head of the character described, comprising a holder, a casing, a driving member, a driven member and a tool spindle, the said driving member including a plurality of idler gears for engagement with the said driven member, means adapted to be engaged by a rotating work spindle for imparting rotary movement to the driving member, the said tool spindle being adapted to receive and retain a threading tool or the like, movable means annularly positioned for predetermined axial movement with the spindle and engageable with a fixed clutch ring continuously during the tool feeding operation for locking the said spindle against rotational movement, the said movable means upon axial movement of the said spindle and at the completion of the tool feeding operation being disengaged from the said clutch ring and engaging the said driven member whereby in cooperation with the said idler gears the said spindle and tool are caused to rotate at a higher velocity than the said driving member to withdraw the said spindle from the work.

3. In a threading head, the combination comprising a holder adapted to be secured to the holding device of a lathe, a driving ring carrying a drive bar, the said drive bar being adapted for engagement with a rotating work spindle to impart rotation to the said driving ring, a driving member and a driven gear, the said driving member being operatively connected with the said driving ring to drive the said driven gear upon engagement of the said drive bar with the work spindle, the said driving member including idler gears for engagement with the said driven gear, a hollow spindle in the said head adapted to receive a threading tool, the said hollow spindle upon predetermined axial positioning thereof being disengaged from the said driven gear and having means for locking same against rotational movement, the said locking means comprising axially movable means in slidable relation with said driven gear and movable within predetermined limits upon the said spindle, the said locking means in cooperation with the said idler gears serving to withdraw the tool from the work upon rotation of the said spindle and tool with the said driving member but at a higher velocity than the said driving member.

4. In a threading head, the combination comprising a holder including a fixed clutch ring with suitably spaced grooving adapted to be secured to the tailstock or turret of a lathe or the like, the said head comprising a driving mechanism and a driven mechanism comprising a driven gear having internal grooving, the said driving mechanism having a drive bar extension adapted for cooperation with the chuck of a lathe or the like to drive the said driven mechanism, a spindle in the said head having a hollow portion adapted to receive a threading tool or the like, the said spindle having annularly arranged ball means movable with the spindle cooperating with the respective grooving of the said clutch ring and the said driven gear so that upon predetermined axial positioning the spindle is disengaged from the said driven gear and is locked with the said clutch ring against rotational movement during the threading operation, resilient means cooperating with the said spindle to permit limited axial movement of the threading tool at completion of the threading operation, whereupon the said ball means lockingly engage the grooving of the said driven gear to effect rotation of the spindle therewith, idler gears cooperating with the said driving mechanism and driven gear for withdrawing the tool from the work by rotating the driven gear and spindle in the same direction but at a higher velocity than the said driving mechanism.

5. In a threading head, the combination comprising a holder adapted to be secured to the holding device of a machine tool, a recessed clutch ring fixed to said holder, the said head comprising a geared driving mechanism and a driven gear having a recess therewithin, locking ball means movably mounted for selective engagement with the recesses of the said driven gear and clutch ring, the said driving mechanism having projecting means adapted for cooperation with the work spindle of the machine tool to drive the said driving mechanism, a tool spindle in the said head adapted to receive a cutting tool, the said tool spindle upon predetermined axial positioning thereof being disengaged from the said driven gear and locked against rotational movement by movement of the said ball means within the recesses of the driven mechanism and the said clutch ring, the locking engagement of the said movable ball means with the recesses of the said driven gear taking place upon completion of the cutting operation by the tool and upon forward movement of the spindle with relation to the head whereupon the spindle and tool are rotated in conjunction with the said geared driving mechanism, idler gear means interconnecting the said driving mechanism and the said driven gear whereby the speed of the driven gear is in excess of that of the driving mechanism for withdrawing the tool from the work.

6. A threading head comprising a holder, a casing, a driving member, a driven member and a tool spindle, idler gear means providing coupling means for rotation between said driving member and said driven member, a clutch ring, a drive bar connecting the driving member with the chuck or spindle of a rotatable work holder, a drive ring upon which said drive bar is mounted, the said tool spindle being reciprocably movable and adapted to receive and retain a threading tool, annularly positioned ball means selectively engaging respective recesses of the said driven member and the said clutch ring for locking the said tool spindle against rotational movement during the threading operation, whereby at an initial predetermined position of the tool, the said drive bar and the said drive ring are caused to rotate together, and at the subsequent completion of the threading operation the said ball means move longitudinally with the said spindle to engage the recesses of the said driven member whereupon the said tool spindle is caused to rotate with the said driving member, the said idler gear means providing for rotating the driven member in the same direction but at a higher speed than the driving member to withdraw the threading tool from the work.

7. A threading head comprising a tool holder, a casing, a driving member, a driven member arranged with annularly extending recessed portions, and a hollow, resiliently mounted spindle, means in combination therewith for resiliently opposing the forward axial movement of the said spindle, a fixed clutch ring provided with complementary annularly extending recessed portions, the said spindle being adapted to receive and to retain a cutting tool, the peripheral portion of the said spindle being provided with ball means axially movable with the spindle to selectively cooperate with the respective recessed portions of the said clutch ring and driven member whereby the said spindle is permitted predetermined reciprocal movement between engagement of the ball means of the spindle within the recessed portions of the said clutch ring and the recessed portions of the said driven member, a drive bar serving as connecting means for the driving member with a rotatable work holder, a drive ring supporting the said drive bar, the said ball means providing that during the thread cutting operation the tool is held non-rotatable with relation to the said holder, but upon completion of the thread cutting operation and in order to withdraw the tool from the article being threaded the said spindle is caused to move forward resiliently relative to the head to carry the ball means from the recesses of the said clutch ring into the recesses of the said driven member, idler gears interconnecting the said driving member and the said driven member, the said cutting tool thereby being caused to rotate so as to be withdrawn from the threaded article by rotating the driven member in the same direction but at a higher velocity than the said driving member.

8. In a threading head, the combination comprising a holder adapted to be secured to the tailstock or turret of a lathe, the said head comprising a geared driving mechanism including a drive ring, a drive bar mounted upon said drive ring for limited axial movement, a fixed clutch ring with peripherally arranged recesses, and a driven mechanism comprising a driven gear having complementary annular recesses, the said drive bar adapted for cooperation with the work spindle of a lathe to drive the said driving and driven mechanism, a tool supporting spindle in the said head adapted to receive a cutting tool, the said tool supporting spindle upon predetermined axial positioning thereof being disengaged from the said driven gear and locked with said clutch ring against rotational movement, locking means including anti-friction means annularly positioned upon the said spindle, the said spindle having adjusting means for positioning the said tool axially relatively to the said drive bar, the said anti-friction means being axially movable with the spindle and selectively within the said recesses of the said clutch ring and the said driven gear, whereby during the tool feeding operation the said anti-friction means are positioned within the recesses of the said clutch ring, and upon completion of the tool feeding operation the said spindle is caused to move forward with relation to the said head to carry the said anti-friction means into the recesses of the driven gear whereupon the said spindle is caused to rotate with the geared driving mechanism in the head, means for reversing the tool feeding operation effective upon engagement of the said spindle with the said driven mechanism including idler gears interconnecting the driving mechanism and driven gear whereby the driven gear is rotated at a higher velocity than the said driving mechanism but in the same direction to withdraw the tool from the work.

9. A threading head having a drive bar adapted to contact with a rotary work chuck to impart rotation thereto, the said head including an axially movable tool supporting spindle, a driving member and a driven member, the said driving member being engageable with the said driven member to drive the said driven member at a rotational velocity in excess of the rotational velocity of the said driving member, the means of engagement between said driving member and said driven member including relatively small and large idler gear portions, the small gear portion being engaged by the said driving member, the large gear portion engaging the said driven member, the said axially movable spindle jointly serving to non-rotatably hold and to feed a threading tool into an article being threaded, ball and detent means cooperating with the said spindle and the said driven member, whereby the tool may be withdrawn from the article being threaded at the completion of the threading operation, the said ball and detent means being engageable with the said driven member upon the occurrence of predetermined axial movement of the said spindle, whereby the spindle and the driving member are rendered simultaneously rotatable, so as to unscrew the threading tool from the article being threaded.

ALFRED MUELLER.